G. K. DAVOL.
AIR COMPRESSOR.
APPLICATION FILED OCT. 6, 1915.

1,310,944.

Patented July 22, 1919.
6 SHEETS—SHEET 5.

WITNESSES:
Cameron A. Whitsett
John A. Dienner

INVENTOR.
George K. Davol
BY
Brown, Hanson & Boettcher
ATTORNEYS.

UNITED STATES PATENT OFFICE.

GEORGE K. DAVOL, OF SAN FRANCISCO, CALIFORNIA, ASSIGNOR, BY MESNE ASSIGNMENTS, TO P. H. REARDON, OF SAN FRANCISCO, CALIFORNIA.

AIR-COMPRESSOR.

1,310,944.  Specification of Letters Patent.  Patented July 22, 1919.

Application filed October 6, 1915. Serial No. 54,309.

*To all whom it may concern:*

Be it known that I, GEORGE K. DAVOL, a citizen of the United States, residing in the city and county of San Francisco, in the State of California, have invented certain new and useful Improvements in Air-Compressors, of which the following forms a specification.

My invention relates more particularly to the construction and arrangement of valves of compressors and to the means for regulating the output of such machines.

My invention can of course be applied to pumping or compressing machines of considerable variety of purpose and design but I will confine this specification to its description as embodied in an air compressor; having a piston reciprocating in a cylinder; other applications being obvious.

My invention provides a valve for air compressors which, while being very light in weight, and silent in operation and permitting of a high speed of action, provides a very large port area without unduly increasing the cylinder clearance.

It also provides an automatic valve which can be thrown open or rendered inoperative when it is desired to stop the delivery or output of the compressor.

There is no method of regulating the output of an air compressor which is more efficient, than that of holding open the inlet valves and so rendering the compressor wholly or partly inoperative until the demand for air again requires its delivery by the machine. Ordinarily, devices for this purpose are complicated and troublesome, and my invention supplies a form of valve which is simple in construction, and at the same time can be instantly thrown open and held inoperative for any period required.

In the accompanying drawings:

Figs. 4—5—6—7—8 and 9 show those parts which together form the essential elements of the working valve.

Similar parts shown in the various views are designated by the same reference numbers in all the views.

It will be seen from the various figures that the general features of my invention comprise a flat plate automatic valve having considerable length and being provided with a number of transverse slots or ports arranged in line. This valve rests on a seat of similar shape having similar slots or ports; the slots in the valve normally coming between the slots or ports on the seat. When however the valve is to be thrown open, the valve plate is moved relative to the seat until the slots or ports in both valve and seat register or come over each other, when of course there is no obstruction to the free flow of air in either direction through valve and seat.

Figure 1:
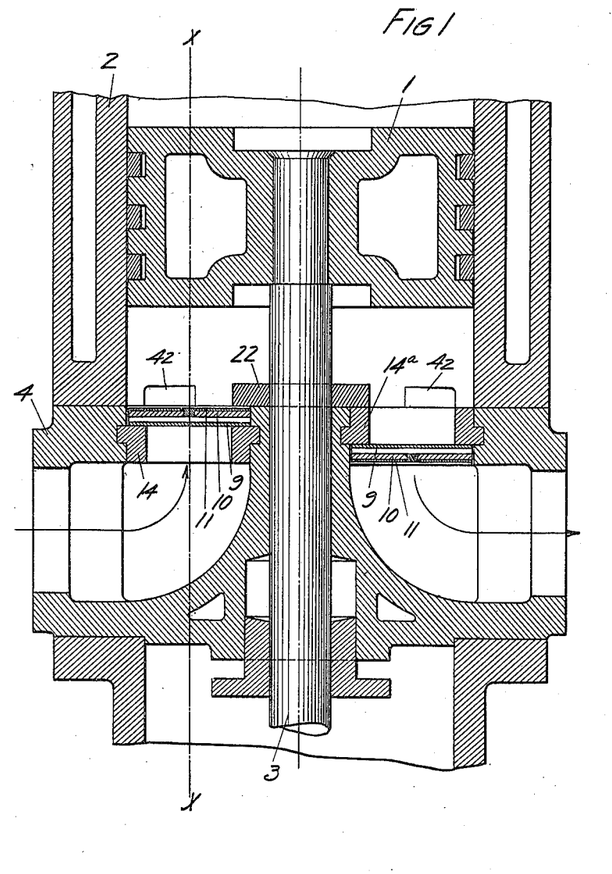
Figure 1 is a section taken on the axis of the cylinder of an air compressor, or on line O—O Figs. 2 and 3, showing inlet and delivery valves in section.

Referring to Fig. 1 a piston 1 reciprocates in the cylinder 2 being moved by the piston rod 3 which derives its movement in any ordinary manner. The cylinder head 4 is secured to the cylinder and frame of the machine by bolts which pass through holes in the head, which are shown in Fig. 3.

Figure 2:
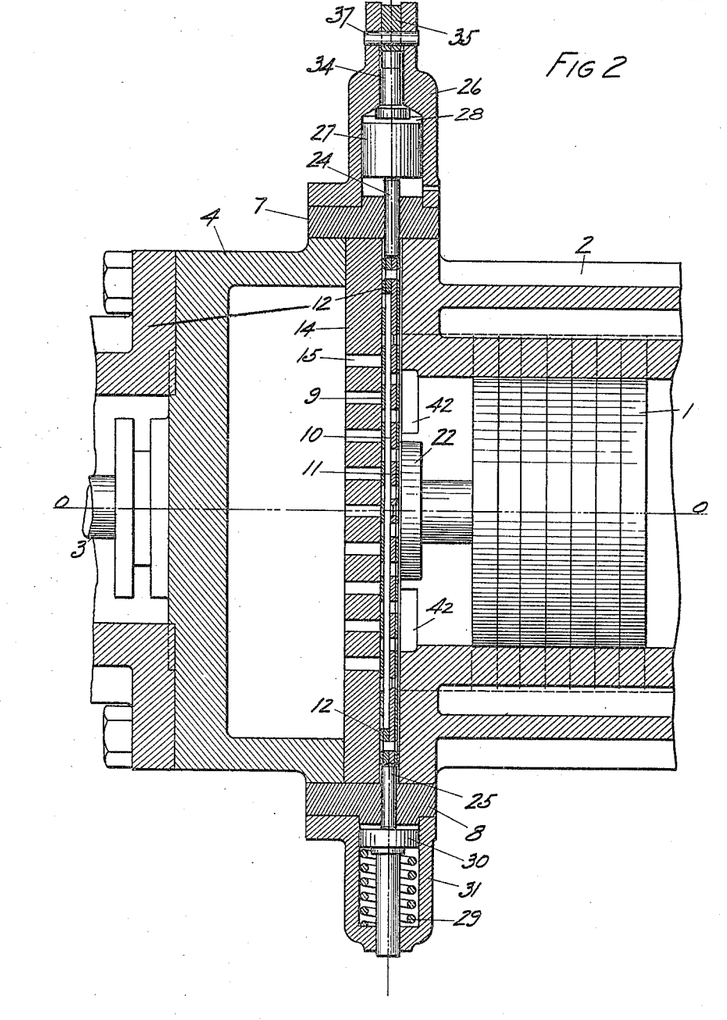
Fig. 2 is a section taken on line *x—x* Figs. 1 and 3 and shows a longitudinal section of the inlet valve and regulating devices.
Figure 3:
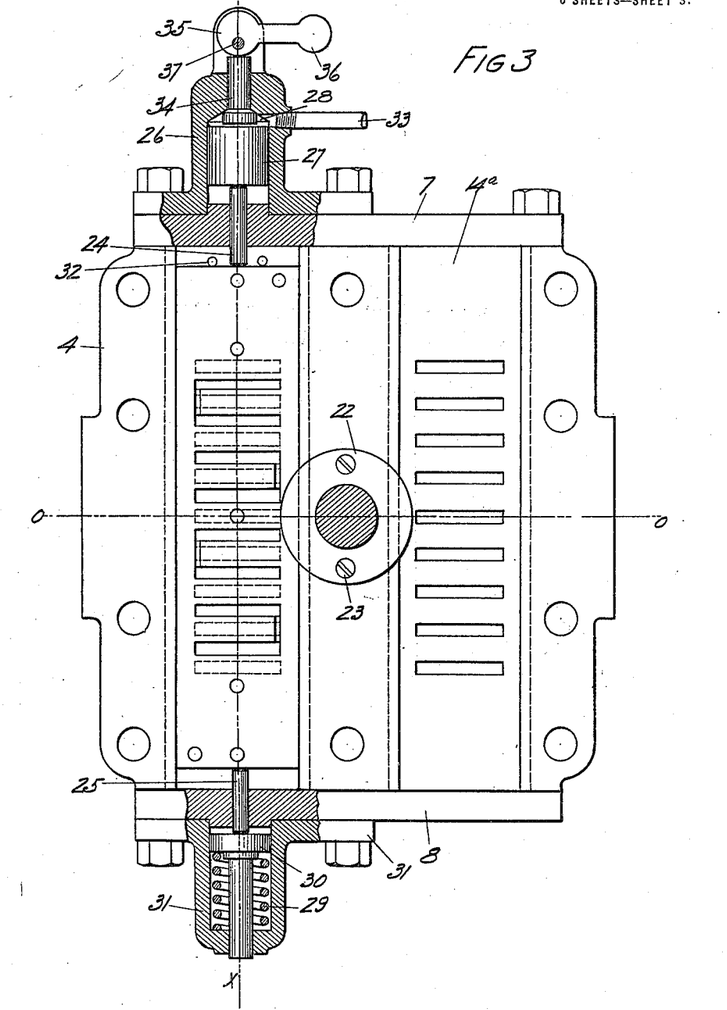
Fig. 3 is a view of the face of the cylinder head with the cylinder removed showing the inlet and delivery valves in place.

It will be seen from Figs. 1, 2 and 3 that the head 4 is provided with two grooved channels or passages passing through it from one side to the other but opening on the face which is secured to the cylinder. In Fig. 3 with the cylinder removed these passages appear open on one side for their whole length while in Figs. 1 and 2 with the cylinder in place they are seen to be closed except where they open to the cylinder bore on one side and to the inlet and delivery air passages on the other.

Figure 16:
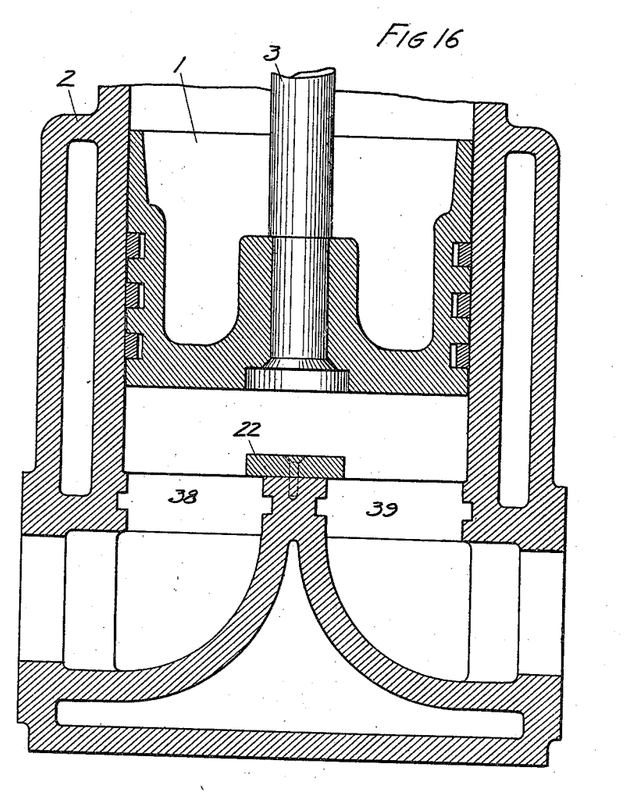
Fig. 16 shows a section taken on the axis of the cylinder of an air compressor showing a modified construction, or manner of forming the passages for the valves in a compressor.

In Fig. 16 which shows a modified form of compressor, the cylinder and cylinder head are in one piece, hence the passages for the valves are slotted out through the single piece.

Referring to Fig. 1 the inlet valve seat 14 and the delivery valve seat 14$^a$ are shown in place. These valve seats are fitted to slide into place from either end and make air-tight connections with the grooves of the passages. They are made of the same length as the passages so that their ends come flush with the external surfaces of the cylinder and cylinder head at each end of the passages.

The ends of the passages are closed by the end plates 7 and 8 Figs. 2 and 3 which plates are securely bolted to both cylinder head and cylinder, which parts are finished to present a flush even surface at each end of the passages. It is expected that a gasket or packing of suitable material will generally be found necessary to make the joint between the plates 7 and 8 and the cylinder, cylinder head and valve seat ends, tight against leakage.

It will now be seen that the valve seats 14 and 14$^a$ form a partition across the air passages communicating with the interior of the cylinder, and make air-tight connection with the surrounding parts on each of their four sides, their two long sides being in fitted contact with the grooved sides of the passages, while their two ends are tightly clamped by the end plates 7 and 8 with suitable sheet packing preferably intervening.

In Figs. 1 and 2 it will be seen that between the inlet valve seat 14 and the cylinder or side of the passage next the cylinder there is left a space, and in this space the valve plate 9 and the parts connected to it comprising the guard plate 10 and spring plate 11 are held.

Figures 4, 5:
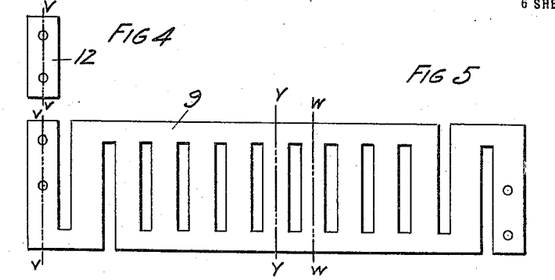
Fig. 4 shows the distance piece going between valve and guard plate.
Fig. 5 shows the valve plate in plan.

The valve plate is most clearly shown in Fig. 5. It is made of thin metal in most cases preferably steel. It has a series of slots or ports cut in it, and at each end these slots are cut through on alternate sides and so the ends are given great flexibility and afford means of securing the valve plate in place without seriously effecting the limited movement of its center portion as a valve.

Figure 6:
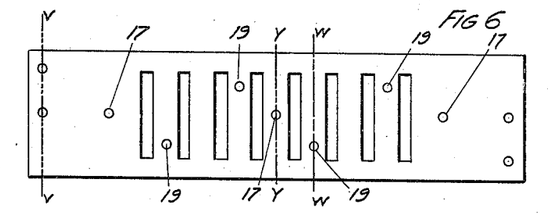
Fig. 6 shows the guard plate in plan.

A guard plate or stop plate 10 is disposed in front of the valve plate when in place, to limit the lift of the valve plate. This guard plate is shown in Fig. 6 and is of relatively thick metal as compared with the valve plate as it is intended to afford a stop of suitable rigidity to the valve movement and also to afford a means of transmitting to the valve an endwise shifting movement as will be later explained.

The distance pieces 12 Fig. 4 are interposed between the valve plate 9 and guard plate 10 at their ends and the thickness of these distance pieces corresponds to the lift allowed the valve plate.

Figure 7:
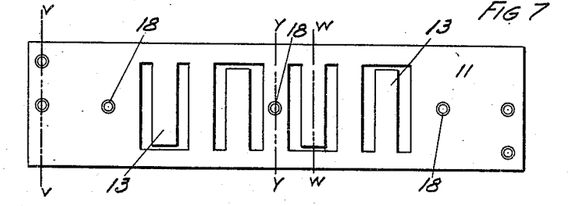
Fig. 7 shows the spring plate in plan.

On the outer side of the guard plate or on the side opposite to that facing the valve plate, the spring plate 11 is secured. This spring plate is made of thin metal and is shown in plan in Fig. 7. It will be seen that it is slotted to correspond to both valve plate and guard plate but that furthermore the slots or ports are cut through to connect with each other at several points. This manner of cutting the plate provides several springy tongues 13 which will elastically yield relatively to the rest of the plate.

Now the inlet valve and the delivery valve of a compressor embodying my invention, are preferably both the same, except that in the inlet valve the valve plate 9 and the connecting parts, viz: guard plate 10, spring plate 11 and distance piece 12 are all allowed an endwise movement relative to the valve seat 14, while in the delivery valve those parts are rigidly secured at their two ends to the valve seat.

Figure 14:
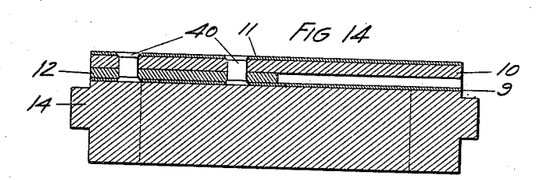
Fig. 14 shows an enlarged cross section of the inlet valve taken on line *v—v* Figs. 5—6—7 and 8.
Figure 15:
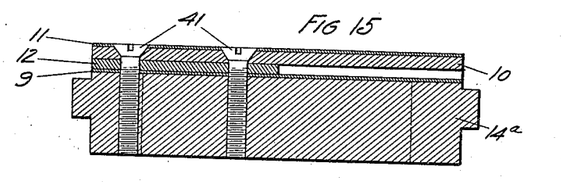
Fig. 15 shows an enlarged cross section of the delivery valve taken on line *v—v* in Figs. 4—5—6—7, and 8.

Figs. 14 and 15 illustrate this difference. Fig. 14 shows a section taken through the valve seat 14, valve plate 9, distance pieces 12, guard plate 10 and spring plate 11 of the inlet, while Fig. 15 shows a similar section of the delivery valve.

It will be seen that in the case of the inlet valve as shown in Fig. 14 the various plates named, with the distance piece, are connected together by two rivets 40, but are free to slide as one piece on the face of the valve seat 14, while in the case of the delivery valve as shown in Fig. 15 these parts are rigidly connected together and also rigidly secured to the valve seat 14$^a$ by screws 41 which pass through all the parts.

Figure 10:
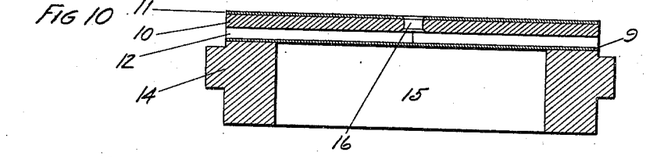
Fig. 10 shows an enlarged cross section of the valve taken on the line *y—y* Figs. 5—6—7 and 8.

Referring to the enlarged sections taken through the valve, Fig. 10 shows a transverse center section and shows the valve plate 9 free from the guard plate 10 resting on the seat 14 and covering the port 15. It also shows how the spring plate 11 is secured to the guard plate 10 by the rivet 16. The spring plate is secured to the guard plate at several points in addition to the point of fastening at its ends; rivet holes for this purpose being shown in the guard plate in Fig. 6 at 17, and in the spring plate in Fig. 7 at 18. This manner of securing the spring plate and guard plate together leaves the tongues 13 free to be flexed or sprung.

Figure 11:
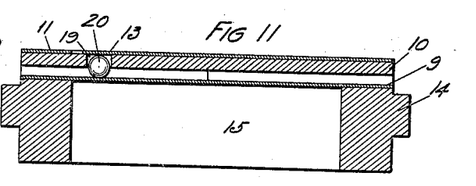
Fig. 11 shows an enlarged cross section of the valve taken on line *w—w* Figs. 5—6—7 and 8.
Figure 12:
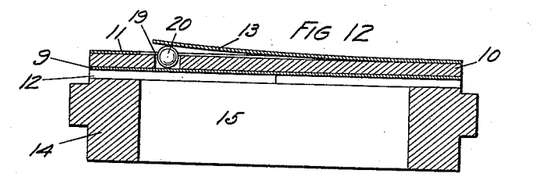
Fig. 12 shows the same view as Fig. 11 but showing the valve raised off its seat.
Figure 13:
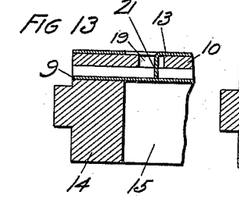
Fig. 13 shows a modification of the connecting means between valve and spring plate.

The spring plate 11 is provided to exert a pressure tending to keep the valve plate 9 on its seat and the means provided for transmitting such pressure from the spring plate to the valve plate is clearly shown in Figs. 11—12 and 13. As shown in these figures, holes 19 also shown in Fig. 6 are provided in the guard plate, and through these holes connection is made between spring plate 11 and valve plate 9. In Figs. 11 and 12 I show a small ball 29 loosely fitting the hole in the guard plate and this ball serves to transmit the downward thrust of the spring plate 11 to the valve plate 9. Fig. 11 shows the valve plate 9 on its seat and the spring tongue 13 resting on the guard plate 10. In Fig. 12 the same parts are shown but with the valve plate 9 forced or lifted off its seat by the flow of air, and the movement transmitted through the ball 20 to the spring tongue 13 which is sprung up off the guard plate and so exerts a pressure tending to return this valve plate 9 to its seat.

Fig. 13 shows a modified form of connection between the spring tongue and valve plate. In this view a projection on the end of the spring tongue 13 is bent down through the hole 19 and rests directly on the valve plate 9. This form of connection has the advantage that there is no frictional contact between the connection and the guard plate, which contact is possible when the ball connection shown in Figs. 11 and 12 is used.

It has now been explained that while in the case of the delivery valve the valve plate 9 and its connecting guard plate and spring plate are all secured at their ends rigidly to the seat 14$^a$, with their slots or ports coming between the slots or ports in the seat, and so being always in operative position, in the case of the inlet valve these parts are free to move endwise relative to the seat so that the slot or ports in the valve plate and connecting plates can be brought over or made to register with those in the seat, or be brought to a position midway between the ports in the seat as it may be desired to render the valve operative or inoperative.

In the case of the inlet valve attention has been called to the space provided as shown in Figs. 1 and 2 between the valve seat 14 and the cylinder for the accommodation of the valve plate and its connecting parts. In Fig. 2 it is clearly shown that the valve plate and parts are held in place on one side by the seat 14 and on the other side by the cylinder 2, but that a considerable clearance is provided at its end to permit of an endwise movement. In Figs. 1—2 and 3 retaining piece 22 is shown which is secured to the cylinder head by two screws 23 Fig. 3. This retaining piece is intended to further assist in retaining the valve plate, guard plate and spring plate in place against the seat 14 and prevent them unduly springing away from the seat during the rush of air in the suction stroke.

The inlet valve plate and its connecting parts can be shifted endwise into operative or inoperative position by any suitable means either under automatic or hand control. It will be probably found generally desirable to have the means for shifting the valve plate controlled by the air pressure in the receiver so that when the receiver pressure rises to a fixed maximum the valve plate is shifted to the inoperative position and so held until the pressure falls.

The means I provide for shifting the valve plate is clearly shown in Figs. 2 and 3. The end plates 7 and 8 which are secured to opposite sides of the cylinder and head, have holes through them opening into the valve plate space, and these holes have the plungers 24 and 25 passing through them and free to move in them. To the plate 7 a shifting cylinder 26 is secured and within this cylinder a shifting piston 27 is held. This piston 27 bears directly against the plunger 24 and when air under pressure is admitted to the space 28 behind it, it moves forward and so, through the plunger 24, moves or shifts the valve plate 9 and its connecting parts on the seat 14. At the opposite end of the valve plate, the plunger 25 bears against it under the action of the spring 29 and spring plunger 30 which are held in the spring bonnet 31 secured to the end plate 8. The shifting piston 27 therefore in its air actuated movement shifts the valve plate against the action of the spring 29 and when the air pressure is relieved from behind it, the spring acts to return the valve plate and connecting parts to its original position.

Figure 8:
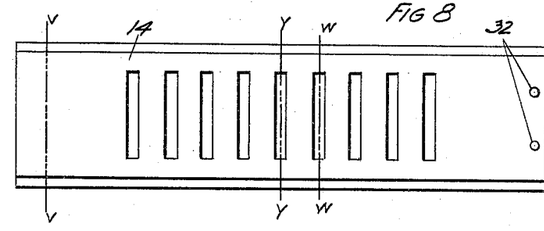
Fig. 8 shows the valve seat in plan.
Figure 9:
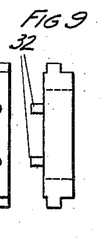
Fig. 9 shows an end view of the valve seat.

This original position in which the valve plate is held by the spring fixed by two bearing studs 32 shown in Fig. 3 and also in Figs. 8 and 9 which are fixed in one end of the valve seat 14 and against which the end of the valve plate and its connecting parts are pushed and held by the spring 29.

In operation the shifting of the inlet valve plate and connecting parts occurs during the suction stroke of the compressor or when the piston is drawing air through the inlet valve seat into the cylinder. The air rushing in in that direction tends to lift the valve plate off its seat and so prevents any objectionable friction between valve plate and seat which might interfere with the ready shifting of the valve plate. During the compression stroke of the compressor piston the inlet valve plate is forced against its seat and held there by the pressure of the air undergoing compression. The shifting piston acts of course during the period of less resistance which is during the suction stroke.

With the means for admitting air under pressure to the valve shifting cylinder, my invention is not concerned. A pipe 33 shown in Fig. 3 is provided and this pipe may be connected to any suitable source of fluid pressure and automatic regulating device desired.

Provision is however made for the hand shifting of the valve plate in addition to the air actuated piston described, and such means is clearly shown in Figs. 2 and 3. At the end of the shifting cylinder 26 a hole is formed and within this hole a plunger 34 is fitted. This plunger has an enlarged collar at its inner end which normally rests against the inside end of the cylinder and so seals the hole against leakage of air. A cam 35 is provided which can be moved by the handle 36 on the axis 37 and so push the plunger 34 in against the piston 27 and so move the valve plate.

While the bore of the cylinder is of course circular, a clear passage for the air through the end ports of the valve into and out of the cylinder is provided for by recessing passages or pockets in the end of the cylinder shown at 42 in Figs. 1 and 2.

In Fig. 16 is shown the manner in which my invention is embodied or carried out in a compressor in which the cylinder and head are both cast in one piece. A single acting cylinder is there shown with its head cast integral with it. The passages 38 and 39 for the inlet and delivery valves are slotted out of the single casting and serve the purpose of holding the valves as well as if the cylinder and head were separate. These through passages are closed at each end by end plates and all parts not shown are the same as in the construction already described.

The relative dimensions and proportions of all the parts shown in the accompanying drawings and their shape and disposition can be considerably changed without affecting my invention.

References in these specifications and in the claims which follow to the application of my invention to "air compresors" are intended to cover its use in connection with the handling of any fluid other than air.

I claim:

1. In combination a cylinder having a relatively shallow rectangular passage formed across the end thereof in a plane substantially perpendicular to the axis of the cylinder, said passage having parallel grooves formed in two of its opposite internal surfaces, end plates closing the ends of said passage and a flat valve seat within said passage, and parallel tongues on two of the opposite sides of the valve seat for coöperation with the grooves of said passage to hold the valve.

2. In combination, a cylinder having an air passage or channel for air inlet or discharge opening in line with the bore of the cylinders, and having also a valve seat passage formed across the end thereof at right angles to the axis of said cylinder and intersecting the bore of the cylinder, said valve seat passage intersecting said air passage, end plates closing the ends of said valve seat passage, and a stationary valve seat held within said valve seat passage and having air-tight contact with the sides of said passage.

3. In combination, a cylinder having an air passage for air inlet or discharge opening in line with the bore of the cylinders, and having also a valve seat passage formed across the end thereof at right angles to the cylinder axis and intersecting the bore of the cylinder, said valve seat passage intersecting said air passage, an end plate for closing one end of said valve seat passage, a stationary valve seat held within said valve seat passage and having air-tight contact with the sides of said passage.

4. In combination, a cylinder, a cylinder head having a flat valve seat passage formed across the end thereof at right angles to the axis of said cylinder, said valve seat passage opening externally on opposite sides of said cylinder head, and said cylinder head having an air channel for conducting air to or from said cylinder, said air channel intersecting said valve seat passage, end plates covering the external openings of said valve seat passage, parallel guides formed in the sides of said valve seat passage, and a stationary flat valve seat held by said parallel guides.

5. In combination, a cylinder having at the end a passage for air inlet or discharge opening through the head of the cylinder, a stationary flat valve seat disposed as a partition across said air passage, said valve seat having parallel sides, parallel grooves for receiving the sides of said seat, a pair of plates, said seat having air-tight connection at its opposite ends with said plates, said plates having air-tight connection with the cylinder.

6. In combination, a cylinder having a passage formed therethrough, said passage having parallel guides, a stationary flat valve seat held in said parallel guides, said valve seat having a series of transverse slots or ports formed therein, and a flexible plate valve seating on said valve seat.

7. In combination, a cylinder having a passage, a valve seat having parallel sides or edges which bear in said passage, a series of transverse slots or ports formed in said valve seat, and a flexible plate valve suitably held to seat on said valve seat, said flexible plate valve having a series of transverse slots or ports.

8. In combination, a cylinder, a cylinder head, said head having a passage formed therethrough in a plane substantially perpendicular to the axis of the cylinder, said passage having flat parallel sides, a nonrotative valve seat having parallel edge faces secured within said passage, said valve seat and said passage having a space formed therebetween, and a valve loosely held in said space and seating on said valve seat, said valve being lifted off of its seat by the working fluid at each working stroke, and means for sliding the valve along the seat to disable the valve.

9. In combination, a cylinder having a head, said head having a passage formed therethrough, said passage opening into said cylinder, a valve seat held within said passage, a valve seating on said valve seat, said valve being movable from said seat by fluid pressure, said valve being lifted off of its seat by the working fluid at each working stroke, and means for sliding the valve along the seat to disable the valve.

10. In combination, a cylinder having a head, said head having a passage formed therethrough in a plane substantially perpendicular to the axis of the cylinder, said passage having openings into said cylinder, a valve seat having parallel sides, said valve seat being mounted in said passage, a valve seating on said valve seat, and being movable therefrom by fluid pressure, said valve being lifted off of its seat by the working fluid at each working stroke and means for sliding the valve along the seat to disable the valve.

11. In combination, a valve seat having a series of slots or ports therethrough, a valve seating on said valve seat, and having a series of corresponding slots or ports, said valve being lifted off of its seat by the working fluid at each working stroke, and means for sliding the valve along the seat to bring said slots or ports in or out of register.

12. In combination, a valve seat having a series of slots or ports, a flexible plate valve seating on said valve seat and having a series of slots or ports, said valve being movable across the face of said valve seat to bring said slots or ports in the valve and in the valve seat into register, or to bring the slots or ports in the valve seat out of register with the ports or slots in the valve.

13. In combination, a cylinder having a cylinder head, said head having a passage formed therethrough in a plane substantially perpendicular to the axis of the cylinder, a flat valve seat member held within said passage and partially filling said passage, a flat automatic lift valve loosely held within said passage, said valve seating on said valve seat and unseated therefrom by fluid pressure, and means to move said valve across the face of said valve seat.

14. In combination, a cylinder having a passage formed therethrough, a valve seat held within said passage, a valve on said valve seat and laterally unseated therefrom by fluid pressure, said valve being loosely held within said passage, a spring tending to force said valve in one direction and a fluid actuated piston for moving said valve along said passage and across the valve seat against the pressure of said spring.

15. In combination, a stationary valve seat having a series of slots or ports, an automatic flexible plate valve having a series of coöperating slots or ports, a guard plate, said valve being secured to said guard plate, said guard plate also having a series of slots or ports which substantially register with the slots or ports formed in said valve, means for holding said flexible valve and said guard plate in front of said valve seat and means for sliding said valve and guard plate along the face of said valve seat.

16. In combination, a guard plate, a valve flexibly secured to one side of said guard plate, a flexible spring plate secured to the opposite side of said guard plate and connecting means between said spring plate and said valve.

17. In combination, a valve, a guard or stop plate disposed in front of said valve, a flexible spring plate secured to the opposite face of said guard plate, an opening through said guard plate and connecting means between said valve and spring plate through said opening.

18. In combination, a flexible plate valve, a guard or stop plate, spacing blocks interposed between said valve and said guard plate and a flexible spring plate, said valve and spacing blocks being secured to one side of said guard plate and said spring plate being secured to the opposite side of said guard plate, and means connecting said spring plate and said valve.

19. In combination, a valve, a guard plate disposed in front of said valve, a flexible spring plate secured on the opposite face of said guard plate and means for connecting said valve and said spring plate.

20. In combination, a valve seat having a series of ports, a flexible plate valve yieldably held against the face of said valve seat and laterally unseated therefrom by fluid pressure, and means for moving said valve along the face of said valve seat.

21. In combination, a valve seat having a series of ports, a guard plate, an automatic plate valve secured to said guard plate, said valve being held against said valve seat and laterally unseated therefrom by fluid pressure, and means for moving said valve and guard plate across the face of said valve seat.

22. A valve comprising a flat metal substantially rectangular plate having a length greater than its width, and having parallel transverse slots formed therein, said plate having an expansible extension on each end thereof formed of the metal of the valve.

23. In combination, a flat plate valve having a length greater than its width, and having a series of parallel transverse ports formed therethrough, said valve having an expansible extension formed on each end thereof, and a guard plate having a series of coöperating ports, said valve being secured to said plate by means of said expansible extensions.

24. In combination, a valve seat having a series of ports, a flexible plate valve yieldingly held against the face of said valve seat, a fluid actuated piston for moving said valve across the face of said valve seat, and manual means for moving said piston.

25. In combination, a valve seat having a series of ports, a flexible plate valve yieldingly held against the face of said valve seat, a spring connected to one end of said valve, a fluid actuated piston connected to the opposite end of said valve and a hand actuated plunger for moving said piston.

26. In combination a cylinder having a relatively shallow passage formed across the end thereof in a plane substantially perpendicular to the axis of the cylinder, a stationary valve seat within said passage, tongue end groove means for mounting said valve seat within said passage and end plates closing the ends of said passage.

27. In combination a valve seat having valve ports, a valve comprising a flexible plate having a plurality of transverse slots and having an expansible extension on each end, said valve being adapted to be lifted from the seat for each working stroke of the valve, and means for holding the outer part of said expansible extensions relatively stationary with respect to said valve seat.

28. In combination a valve seat having valve ports, a valve comprising a flexible plate having a plurality of transverse slots and having an expansible extension on each end, said valve being adapted to be lifted from the seat for each working stroke of the valve, means for holding the outer part of said expansible extensions relatively stationary with respect to said valve seat, and independent means for shifting said holding means edgewise to move the valve edgewise over the seat to disable the valve.

In witness whereof, I hereunto subscribe my name this 29th day of September A. D. 1915.

GEORGE K. DAVOL.

Witnesses:
W. W. HEALEY,
M. E. EWING.